(12) United States Patent
Sogabe

(10) Patent No.: US 7,744,467 B2
(45) Date of Patent: Jun. 29, 2010

(54) VIDEO GAME PROGRAM, VIDEO GAME DEVICE, AND VIDEO GAME METHOD

(75) Inventor: Daisuke Sogabe, Tokyo (JP)

(73) Assignee: Konami Digital Entertainment Co, Ltd., Tokyo (JP)

( * ) Notice: Subject to any disclaimer, the term of this patent is extended or adjusted under 35 U.S.C. 154(b) by 505 days.

(21) Appl. No.: 10/595,162

(22) PCT Filed: Sep. 7, 2004

(86) PCT No.: PCT/JP2004/012974

§ 371 (c)(1),
(2), (4) Date: Mar. 13, 2006

(87) PCT Pub. No.: WO2005/025706

PCT Pub. Date: Mar. 24, 2005

(65) Prior Publication Data

US 2006/0281547 A1 Dec. 14, 2006

(30) Foreign Application Priority Data

Sep. 12, 2003 (JP) ............................... 2003-321219

(51) Int. Cl.
G06F 19/00 (2006.01)
(52) U.S. Cl. .......................................... 463/42; 463/35
(58) Field of Classification Search .................... 463/35, 463/40–43; 386/46, 68; 84/615, 601; 704/231, 704/270.1
See application file for complete search history.

(56) References Cited

U.S. PATENT DOCUMENTS

| 6,289,165 B1 * | 9/2001 | Abecassis | 386/46 |
| 6,408,128 B1 * | 6/2002 | Abecassis | 386/68 |
| 2001/0006909 A1 * | 7/2001 | Mirasaki et al. | 463/35 |

FOREIGN PATENT DOCUMENTS

| JP | 7/163754 A | 6/1995 |
| JP | 10/104005 A | 4/1998 |
| JP | 10-211359 * | 8/1998 |
| JP | 10/211359 A | 8/1998 |

\* cited by examiner

Primary Examiner—Peter DungBa Vo
Assistant Examiner—Masud Ahmed
(74) Attorney, Agent, or Firm—Global IP Counselors, LLP

(57) ABSTRACT

A video game program includes a terminology storing function, a first running commentary function, a running commentary interrupting function, a second running commentary function, a running commentary returning function, and a running commentary continuing function. In the video game implemented with this program, if specific events occur while the video game is in progress and the play-by-play or commentary is interrupted, the system returns from the play-by-play or commentary related to the specific events to the interrupted play-by-play or commentary, after the play-by-play or commentary has been provided for the specific events, and the interrupted play-by-play or commentary is continued.

9 Claims, 5 Drawing Sheets

VIDEO GAME PROGRAM, VIDEO GAME DEVICE, AND VIDEO GAME METHOD

TECHNICAL FIELD

The present invention relates to a video game program, and particularly to a video game program for implementing a video game on a computer which displays a character on a monitor and in which the operation of the character can be controlled. In addition, the present invention relates to a video game device and a video game method implemented with this video game program.

BACKGROUND ART

Various video games have been proposed in the past. One such game is a video game, such as a baseball video game, which displays a character on a monitor, in which the operation of the character can be controlled, and which includes a running commentary function (See Japan Patent Application Publication No. 5-313705, for example). In this baseball video game, the operation of the character can be controlled with a controller. Then, each type of event in the game which progresses by operation of a character is given play-by-play or commentary using running commentary terminology which is recorded in advance. In a video game with a running commentary function, when a specific event occurs in the game by operation of a character, the play-by-play or commentary up to the occurrence of the specific event is generally interrupted, and play-by-play or commentary related to the specific event is given independently of the play-by-play or commentary up to the occurrence of the specific event.

In a conventional video game with a running commentary function, when a specific event occurs in the game by operation of a character, and the play-by-play or commentary is interrupted, play-by-play or commentary related to the specific event is given independently of the play-by-play or commentary up to the occurrence of the specific event. Thus, as more specific events occur, the play-by-play or commentary may be cut off at times. Also, when the play-by-play or commentary is interrupted, the video game player cannot listen to the play-by-play or commentary following the interruption, because the interrupted play-by-play or commentary is not provided again. For this reason, there is a problem in that it becomes difficult for the video game player to understand what events have occurred in the game from the play-by-play or commentary, and the video game player cannot experience a sufficient sense of realism from the play-by-play or commentary during the game.

An object of the present invention is to allow a video game player to easily understand the various events that occur during the game from the play-by-play or commentary when such events occur during the game, and experience a sense of realism from the play-by-play or commentary during the game.

DISCLOSURE OF THE INVENTION

A first aspect of the invention is a video game program for causing the following functions to be implemented in a video game on a computer, the video game displaying a character on a monitor and allowing the operation of the character to be controlled.

(1) A terminology storing function for storing running commentary terminology used while the video game is in progress.

(2) A first running commentary function for performing play-by-play or commentary relating to the video game using the running commentary terminology.

(3) A running commentary interrupting function for interrupting the first running commentary function when specific events have occurred while the video game is in progress.

(4) A second running commentary function for performing play-by-play or commentary relating to specific events when the running commentary interrupting function has been executed.

(5) A running commentary returning function for causing the return from the second running commentary function to the first running commentary function.

(6) A running commentary continuing function for causing the continuation of the play-by-play or commentary by the first running commentary function which was interrupted by the running commentary interrupting function, when the running commentary returning function has been executed.

In a video game implemented with this program, the running commentary terminology used while the video game is in progress is stored by the terminology storing function. Play-by-play and commentary relating to the video game is performed by the first running commentary function using the running commentary terminology stored in this terminology storing function. Then, when specific events have occurred while the video game is in progress, the play-by-play or commentary in progress with the first running commentary function is interrupted by the running commentary interrupting function. In this way, when the play-by-play or commentary is interrupted by the running commentary interrupting function, play-by-play or commentary relating to the specific event is performed by the second running commentary function. Afterwards, the running commentary returning function causes a return from the second running commentary function to the first running commentary function. The running commentary continuing function causes the continuation of the play-by-play or commentary by the first running commentary function, which was interrupted by the running commentary interrupting function, when the running commentary returning function has been executed.

Here, when specific events occur while the video game is in progress and the play-by-play or commentary in progress with the first running commentary function is interrupted by the running commentary interrupting function, play-by-play or commentary relating to the specific event is performed by the second running commentary function. Then, the play-by-play or commentary interrupted by the running commentary interrupting function is returned to, from the play-by-play or commentary relating to the specific event, and the play-by-play or commentary in progress with the first running commentary function is continued. Thereby, the player can easily grasp various events occurring during the game from the play-by-play or commentary, when such events occur during the game, and can experience a sense of realism from the play-by-play or commentary during the game.

In the video game program according to a second aspect of the present invention, the first running commentary function according to the video game program of the first aspect comprises a first terminology selecting function, a first selected terminology storing function, a first audio output function, and a first transmission function. The first terminology selecting function selects running commentary terminology stored in the terminology storing function and used while the video game is in progress. The first selected terminology storing function stores the running commentary terminology selected by the first terminology selecting function. The first audio output function outputs as sound the running commentary terminology stored in the first selected terminology storing function. The first transmission function transmits the running commentary terminology from the first selected terminology storing function to the first audio output function.

Here, when the running commentary terminology is selected by the first terminology selecting function, the selected running commentary terminology is stored by the first selected terminology storing function. Then, the running commentary terminology is transmitted by the first transmission function from the first selected terminology storing function to the first audio output function and output as sound by the first audio output function. In this case, because the running commentary terminology selected by the first terminology selecting function is stored in the first selected terminology storing function, the contents of the interrupted play-by-play or commentary can be retained, even when specific events occur while the game is in progress and the play-by-play or commentary is interrupted. Also, when the running commentary terminology is transmitted by the first transmission function from the first selected terminology storing function to the first audio output function, the transmission load can be reduced if the contents of the play-by-play or commentary are transmitted divided according to predetermined types of contents.

In the video game program according to a third aspect of the present invention, the running commentary continuing function according to the video game program of the second aspect causes the continuation of the play-by-play or commentary of the first running commentary function, based on the running commentary terminology stored in the first selected terminology storing function of the first running commentary function. In this case, if a specific event occurs while the game is in progress and the play-by-play or commentary is interrupted, the contents of the play-by-play or commentary of the first running commentary function at the interruption are retained in the first selected terminology storing function, and therefore the running commentary continuing function can cause the continuation of the play-by-play or commentary of the first running commentary function.

In the video game program according to a fourth aspect of the present invention, the details of the specific events according to the video game program of any one of the first to third aspects are distinguished and it is determined whether to interrupt the first running commentary function by the running commentary interrupting function. In this case, the details of the specific event are distinguished by the running commentary interrupting function, and therefore, the play-by-play or commentary is interrupted or continued according to the details of the specific event. Accordingly, the running commentary interrupting function can be caused to execute a branching process, wherein the play-by-play or commentary is interrupted when the details of the specific event are important, and the play-by-play or commentary is continued when the details of the specific event are not important.

In the video game program according to a fifth aspect of the present invention, the second running commentary function according to the video game program of any one of the first to fourth aspects comprises a second terminology selecting function, a second selected terminology storing function, a second audio output function, and a second transmission function. The second terminology selecting function selects running commentary terminology stored in the terminology storing function and used while the video game is in progress. The second selected terminology storing function stores the running commentary terminology selected by the second terminology selecting function. The second audio output function outputs as sound the running commentary terminology stored in the second selected terminology storing function. The second transmission function transmits the running commentary terminology from the second selected terminology storing function to the second audio output function.

Here, when the running commentary terminology is selected by the second terminology selecting function, the selected running commentary terminology is stored in the second selected terminology storing function. Then, the running commentary terminology is transmitted by the second transmission function from the second selected terminology storing function to the second audio output function, and output as sound by the second audio output function. In this case, because the running commentary terminology selected by the second terminology selecting function is stored in the second selected terminology storing function, the transmission load can be reduced if the contents of the play-by-play or commentary can be transmitted divided according to predetermined types of contents, when the running commentary terminology is transmitted by the second transmission function from the second selected terminology storing function to the second audio output function.

In the video game program according to a sixth aspect of the present invention, various phrases, according to the contents of the play-by-play or commentary, are formed with the running commentary terminology, in the first and second running commentary function according to the video game program of any one of the first to fifth aspects. These various phrases are collected as phrase groups. In this case, because the various phrases are collected as phrase groups according to the contents of the play-by-play or commentary, the contents of the play-by-play or commentary at the time of the interruption can be recognized in phrase group units by first running commentary means, if a specific event occurs while the game is in progress and the play-by-play or commentary is interrupted. Thereby, when caused to return from the second running commentary function to the first running commentary function by the running commentary returning function, the phrases can be continued from any phrase in the interrupted phrase group.

In the video game program according to a seventh aspect of the present invention, attributes of the phrase group are established and, based on these attributes, it is determined whether the running commentary returning function is to be executed according to the video game program of the sixth aspect. In this case, by establishing attributes for the phrase groups, the running commentary returning function can cause the return of the play-by-play or commentary according to the attributes under various conditions.

The video game device according to an eighth aspect of the present invention claim 8 is a device with which a character is displayed on a monitor and the operation of the character can be controlled, comprising: terminology storing means for storing running commentary terminology used while the video game is in progress; first running commentary means for performing play-by-play or commentary relating to the video game using the running commentary terminology; running commentary interrupting means for causing the interruption of the first running commentary means when a specific event has occurred while the video game is in progress; second running commentary means for performing play-by-play or commentary relating to the specific event when the running commentary interrupting means has been executed; running commentary returning means for causing the return from the second running commentary means to the first running commentary means; and running commentary continuing means for continuing the play-by-play or commentary of the first running commentary means which was interrupted by the running commentary interrupting means when the running commentary returning means has been executed.

The video game method according to a ninth aspect of the present invention is a method with which a character is displayed on a monitor and the operation of the character can be controlled, comprising: a terminology storing step for storing running commentary terminology used while the video game is in progress; a first running commentary step for performing play-by-play or commentary relating to the video game using the running commentary terminology; a running commentary interrupting step for causing the interruption of the first running commentary step when a specific event has occurred while the video game is in progress; a second running commentary step for performing play-by-play or commentary relating to the specific event when the running commentary interrupting step has been executed; a running commentary returning step for causing the return from the second running commentary step to the first running commentary step; and a running commentary continuing step for continuing the play-by-play or commentary of the first running commentary step which was interrupted by the running commentary interrupting step when the running commentary returning step was executed.

PREFERRED EMBODIMENTS OF THE INVENTION

Constitution and Operation of the Video Game Device

Figure 1:
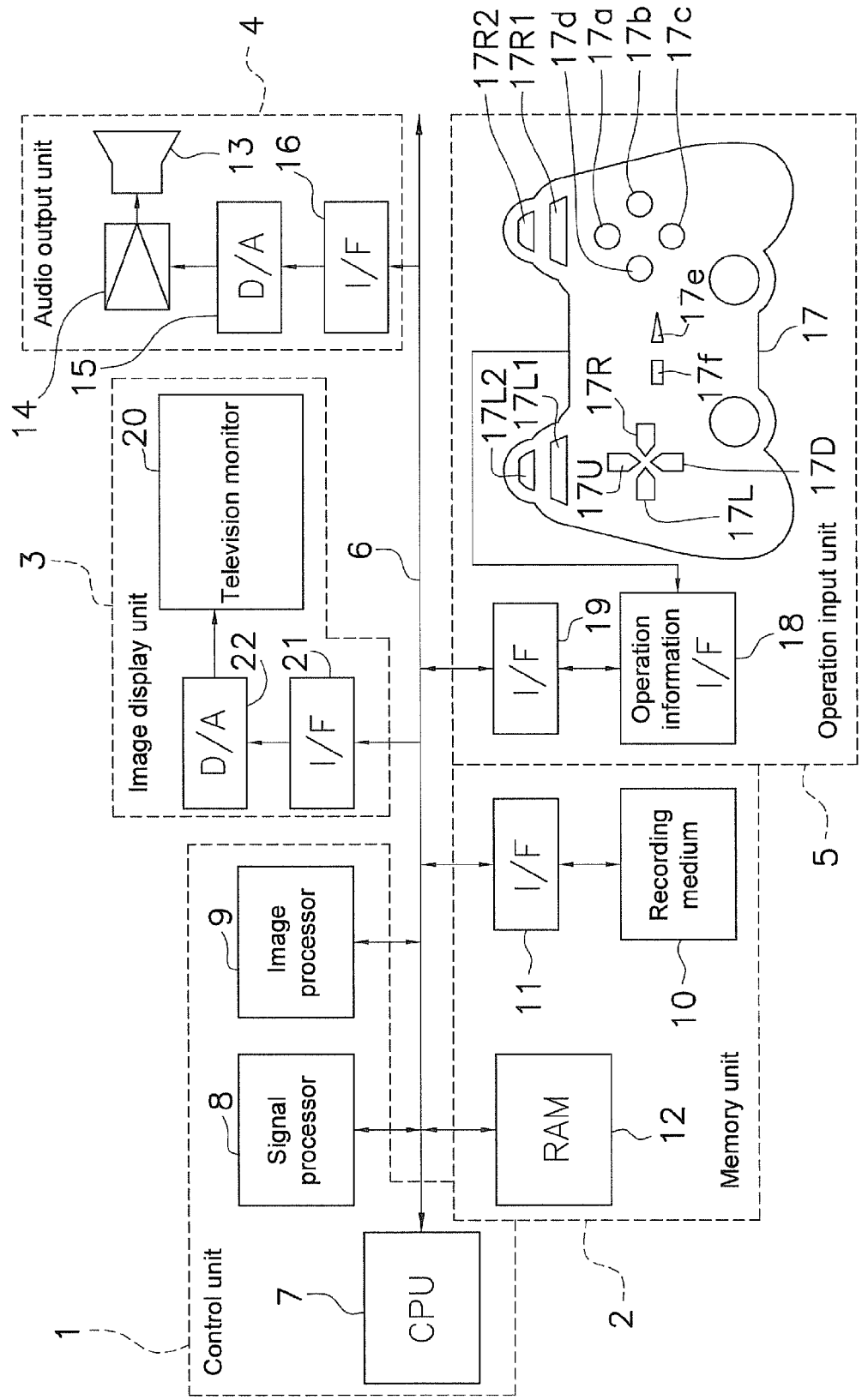
FIG. 1 is a basic schematic view of the video game device according to a first embodiment of the present invention.

FIG. 1 shows the basic constitution of the video game device according to a first embodiment of the present invention. This description uses a home video game device as an example of a video game device. The home video game device comprises a home game device body and a home television. A recording medium 10 can be loaded in the home game device body; game data is appropriately read from the recording medium 10 and a game is executed. The contents of the game executed in this way are displayed on the home television.

The home game device body principally comprises a CPU (Central Processing Unit) 7, a signal processor 8, a image processor 9, a recording medium 10, an interface circuit 11, RAM (Random Access Memory) 12, a speaker 13, an amplifier circuit 14, a D/A converter (Digital-to-analog converter) 15, an interface circuit 16, a controller 17, an operation information interface circuit 18, and an interface circuit 19. The home television comprises a television monitor 20, an interface circuit 21, and a D/A converter 22.

The game system of the home video game device comprises a control unit 1, a storage unit 2, an image display unit 3, an audio output unit 4, and an operation input unit 5, each of which is connected over the bus 6. This bus 6 includes an address bus, a data bus, a control bus, and the like.

The control unit 1 is provided mainly to control the progress of the overall game, based on the game program. The control unit 1 comprises the CPU 7, the signal processor 8, and the image processor 9, for example. The CPU 7, the signal processor 8, and the image processor 9 are each connected together over the bus 6. The CPU 7 interprets commands from the game program and performs various data processing and control. For example, the CPU 7 commands the signal processor 8 to provide image data to the image processor. The signal processor 8 mainly performs computations in three-dimensional space, position conversion computations from three-dimensional space to an artificial three-dimensional space, light source computation processing, and the generation and processing of image and audio data. The image processor 9 mainly performs processing to write image data to be rendered to the RAM 12 based on the computation results and processing results of the signal processor 8.

The storage unit 2 is provided mainly to store program data, various data used in program data, and the like. The storage unit 2 comprises the recording medium 10, the interface circuit 11, and the RAM 12, for example. The interface circuit 11 is connected to the recording medium 10. The interface circuit 11 and RAM 12 are connected via the bus 6. The recording medium 10 has the purpose of recording program data of the operating system, game data comprising image data, audio data, and various program data, and the like. For example, this recording medium 10 is a ROM (Read Only Memory) cassette, optical disk, flexible disk, or the like; and program data of the operating system, game data, and the like are recorded. Note that the recording medium 10 also includes card-type memory; this card-type memory is mainly used to store various game parameters at the point of interruption when the game is interrupted. The RAM 12 is used to temporarily store various data read from the recording medium 10, and to temporarily record processing results from the control unit 1. In addition to various data, address data showing the memory location of various data is stored in this RAM 12; it is possible to specify and read and write.

The image display unit 3 is provided mainly to output, as images, image data written to the RAM 12 by the image processor 9, image data read from the recording medium 10, and the like. The image display unit 3 comprises a television monitor 20, an interface circuit 21, and a D/A converter 22, for example. The D/A converter 22 is connected to the television monitor 20; and the interface circuit 21 is connected to the D/A converter 22. The bus 6 is then connected to the interface circuit 21. Here, image data is provided to the D/A converter 22 via the interface circuit 21 and is there converted to an analog image signal. Then, the analog image signal is output as an image by the television monitor 20.

This image data includes polygon data, texture data, and the like, for example. Polygon data is coordinate data of vertices constituting a polygon. Texture data has the purpose of providing texture to the polygon, and comprises texture indicating data and texture color data. The texture indicating data is data for linking a polygon and texture; and texture color data is data for specifying the color of the texture. Polygon address data and texture address data, showing the memory location of each type of data, are linked to the polygon data and texture data. With such image data, the signal processor 8 performs coordinate conversion and perspective projection conversion, based on the distance data and rotation data of the screen itself (point of view), for the polygon data in three-dimensional space (three-dimensional polygon data) shown by the polygon address data, and replaces the three-dimensional polygon data with polygon data in two-dimensional space (two-dimensional polygon data). A polygon outline is constituted with a plurality of two-dimensional polygon data; and texture data, indicated by the texture address data, is written to the interior of the polygon. In this way, objects with texture applied to each polygon can represent, for example, a coach character, a player character, a referee character, a ball character, and the like.

The audio output unit 4 is provided mainly to output as sound audio data read from the recording medium 10. The audio output unit 4 comprises a speaker 13, an amplifier circuit 14, a D/A converter 15, and an interface circuit 16, for example. The amplifier circuit 14 is connected to the speaker 13; the D/A converter 15 is connected to the amplifier circuit 14; and the interface circuit 16 is connected to the D/A converter 15. The bus 6 is then connected to the interface circuit 16. The audio data is provided to the D/A converter 15 via the interface circuit 16 and is converted to an analog audio signal. This analog audio signal is amplified by the amplifier circuit 14 and output from the speaker 13 as sound. Audio data includes, for example, ADPCM (Adaptive Differential Pulse Code Modulation) data, PCM (Pulse Code Modulation) data, and the like. In the case of ADPCM data, the sound can be output from the speaker 13 with the same type of processing method as described above. In the case of PCM data, the PCM data are converted to ADPCM data in the RAM 12, and the sound can be output from the speaker 13 with the same type of processing method as described above.

The operation input unit 5 comprises mainly a controller 17, an operation information interface circuit 18, and an interface circuit 19. The operation information interface circuit 18 is connected to the controller 17; and the interface circuit 19 is connected to the operation information interface circuit 18. The bus 6 is then connected to the interface circuit 19.

The controller 17 is an operation device used for the player to input various operation commands and sends operation signals according to the player's operations to the CPU 7. The following are provided on the controller 17: a first button 17*a*, a second button 17*b*, a third button 17*c*, a fourth button 17*d*, an up key 17U, a down key 17D, a left key 17L, a right key 17R, an L1 button 17L1, an L2 button 17L2, an R1 button 17R1, an R2 button 17R2, a start button 17*e*, a select button 17*f*, a left stick 17SL, and a right stick 17SR.

The up key 17U, the down key 17D, the left key 17L, and the right key 17R are used to provide to the CPU 7 commands causing the characters and cursor to move up, down, left, or right on the screen of the television monitor 20, for example.

The start button 17*e* is used when instructing the CPU 7 to load the game program from the recording medium 10, or the like.

The select button 17*f* is used when indicating various selections to the CPU 7, and the like, for the game program loaded from the recording medium 10.

The left stick 17 SL and the right stick 17SR are stick-shaped controllers of approximately the same constitution as what is called a joystick. The stick-shaped controller comprises an upright stick. This stick has an inclinable structure, with a range of 360 degrees, including forward, back, left, and right, from the upright position centered on a fulcrum. The left stick 17SL and right stick 17SR send x and y coordinate values with the origin being the upright position, according to the direction and angle of inclination of the stick, as an operation signal to the CPU 7 via the operation information interface circuit 18 and interface circuit 19.

According to the game program loaded from the recording medium 10, various functions are allocated to the first button 17*a*, the second button 17*b*, the third button 17*c*, the fourth button 17*d*, the L1 button 17L1, the L2 button 17L2, the R1 button 17R1, and the R2 button 17R2.

Note that each button and each key on the controller 17, excluding the left stick 17SL and the right stick 17SR, are ON/OFF switches which turn ON when depressed from the neutral position with the application of external pressure, and turn OFF upon returning to the neutral position when the pressure is released.

The general operation of the home video game device with the constitution discussed above is described below. When the power switch (not shown) is turned on and the game system 1 is powered up, the CPU 7 reads image data, audio data, and program data from the recording medium 10, based on the operating system stored in the recording medium 10. All or part of the image data, audio data, and program data read is stored in the RAM 12. Then, the CPU 7 issues commands for the image data and audio data stored in the RAM 12, based on the program data stored in the RAM 12.

In the case of image data, the signal processor 8 performs position computation and light source computation for characters in three-dimensional space, based on the commands from the CPU 7. Next, the image processor 9 performs the writing and the like of image data to be rendered to the RAM 12, based on the computation results from the signal processor 8. The image data written to the RAM 12 are sent to the D/A converter 17 via the interface circuit 13. Here, the image data are converted to an analog video signal with the D/A converter 17. Then, the image data are provided to the television monitor 20 and displayed as an image.

In the case of audio data, the signal processor 8 performs processing to generate and process audio data based on a command from the CPU 7. For example, processing to convert pitch, add noise, set an envelope, set the level, add reverb, and the like is performed for the audio data. Next, the audio data is output from the signal processor 8 and provided to the D/A converter 15 via the interface circuit 16. Here, the audio data is converted to an analog audio signal. Then, the audio data is output as sound from the speaker 13 via the amplifier circuit 14.

Various Functions in the Video Game Device

Figure 2:
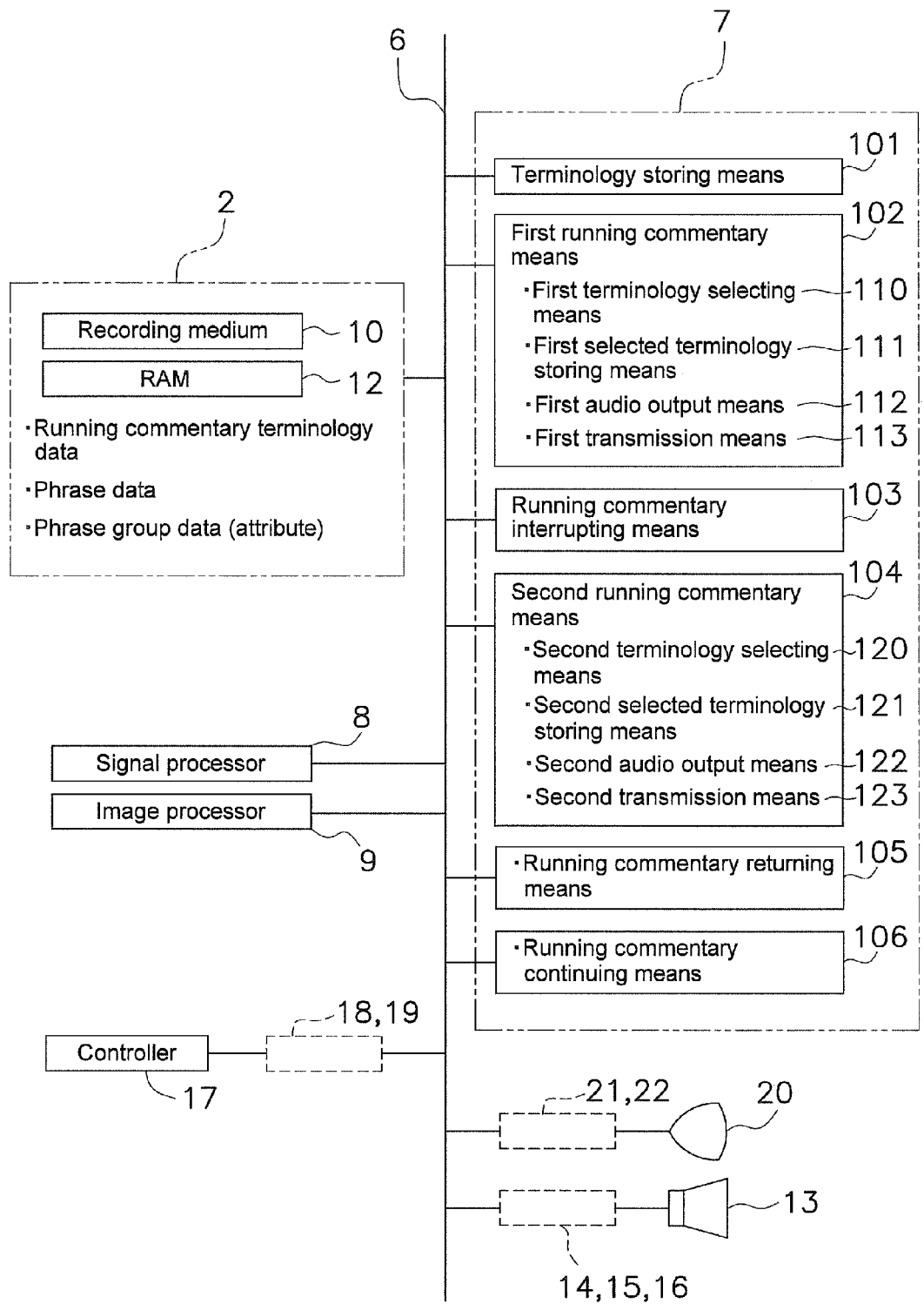
FIG. 2 is a functional block diagram describing the principal functions of the CPU 7 shown in FIG. 1.

The video game executed in the video game device is, for example, a baseball video game with a running commentary function. FIG. 2 is a functional block diagram mainly for describing the functions of the CPU 7 shown in FIG. 1. The functions of the baseball video game device which play an important role in this invention are described using this functional block diagram.

The baseball video game device is a baseball video game device, which displays player characters on a television monitor 20, the operations of the player characters being controlled with the controller 17 and the control unit 1, and which comprises terminology storing means 101, first running commentary means 102, running commentary interrupting means 103, second running commentary means 104, running commentary returning means 105, and running commentary continuing means 106.

The terminology storing means 101 is a means for storing running commentary terminology data used while the video game is in progress. In the terminology storing means 101, the running commentary terminology data are read from the recording medium 5 and stored in the RAM 12 by the CPU 7. Here, the running commentary terminology data stored in the RAM 12 are stored in the RAM 12 in the form of digital audio waveform data.

The first running commentary means 102 is means for using the running commentary terminology data stored in the RAM 12 with the terminology storing means 101, and providing play-by-play or commentary for various events in the baseball video game. With this first running commentary means 102, the play-by-play or commentary for various events in the baseball video game are output as sound from the speaker 13, according to the running commentary terminology data stored in the RAM 12.

The first running commentary means 102 comprises first terminology selecting means 110, first selected terminology storing means 111, first audio output means 112, and first transmission means 113. With the first terminology selecting means, the running commentary terminology data stored in the RAM 12 with the terminology storing means 101 are selected according to various events in the first running commentary means 102. At this time, the selected running commentary terminology data are correlated by the CPU 7, and various phrase data are formed according to the contents of the play-by-play or commentary.

Then, the various phrase data are collected as phrase group data, for each of the types of content of the play-by-play or commentary, by the CPU 7, and attributes are established for the phrase group data. With the first selected terminology storing means 111, the running commentary terminology data selected by the first terminology selecting means 110, the phrase data, and the phrase group data with set attributes are stored in the RAM 12.

With the first transmission means 113, the phrase data stored in the RAM 12 with the first selected terminology storing means 111 is transmitted from the first selected terminology storing means 111 to the first audio output means 112. With the first audio output means 112, the phrase data stored in the RAM 12 with the first selected terminology storing means 111 is provided to the D/A converter 15 via the interface circuit 16, and is there converted to an analog audio signal. This analog audio signal is amplified by the amplifier circuit 14 and output from the speaker 13 as sound.

The running commentary interrupting means 103 is a means for interrupting the first running commentary means 102 when specific events have occurred while the game is in progress. With this running commentary interrupting means 103, the details of the specific events are distinguished by the CPU 7. Then, according to the details of the specific events, the CPU 7 determines whether to interrupt the first running commentary means 102. In effect, a branching process is executed by the CPU 7, this branching process being to interrupt the play-by-play or commentary of the first running commentary means 102 when the details of the specific events are important, and to continue the play-by-play or commentary of the first running commentary means 102 when the details of the specific events are not important.

The second running commentary means 104 is means for performing play-by-play or commentary relating to specific events when the running commentary interrupting means 103 has been executed. With this second running commentary means 104, the play-by-play or commentary relating to the specific events is output as sound from the speaker 13 when the first running commentary means 102 has been interrupted by the running commentary interrupting means 103.

The second running commentary means 104 comprises second terminology selecting means 120, second selected terminology storing means 121, second audio output means 122, and second transmission means 123. With the second terminology selecting means 120, the running commentary terminology data stored in the RAM 12 in the terminology storing means 101 are selected according to the details of the specific events. At this time, the selected running commentary terminology data are correlated by the CPU 7, and various phrase data are formed according to the contents of the play-by-play or commentary. Then, the various phrase data are collected as phrase group data, for each the types of content of the play-by-play or commentary, by the CPU 7, and attributes are established for the phrase group data. With the second selected terminology storing means 121, the running commentary terminology data selected by the second terminology selecting means 120, the phrase data, and the phrase group data with set attributes are stored in the RAM 12. With the second transmission means 123, the phrase data stored in the RAM 12 with the second selected terminology storing means 121 are transmitted from the second selected terminology storing means 121 to the second audio output means 122. With the second audio output means 122, the phrase data stored in the RAM 12 with the second selected terminology storing means 121 are provided to the D/A converter 15 via the interface circuit 16, and converted to an analog audio signal. This analog audio signal is amplified by the amplifier circuit 14 and output from the speaker 13 as sound.

The running commentary returning means 105 is means for returning to the first running commentary means 102 from the second running commentary means 104. With this running commentary returning means 105, the attributes established for the phrase group data are referenced by the CPU 7, and it is determined whether to return from the second running commentary means 104 to the first running commentary means 102.

The running commentary continuing means 106 is means for continuing the play-by-play or commentary of the first running commentary means 102 that was interrupted by the running commentary interrupting means 103, when the running commentary returning means 105 has been executed. The running commentary continuing means 106 causes the continuation of the play-by-play or commentary of the first running commentary means 102, based on the running commentary terminology stored in the first selected terminology storing means 111 of the first running commentary means 102. With such running commentary continuing means 106, the running commentary terminology data and phrase data, stored in the RAM 12 with the first selected terminology storing means 111 of the first running commentary means 102, are referenced by the CPU 7 when the running commentary returning means 105 has been executed. Then, the play-by-play or commentary of the first running commentary means 102 is continued after the interruption, based on the running commentary terminology data and phrase data.

Method for Executing the Running Commentary Function of the Baseball Video Game

Figure 3:
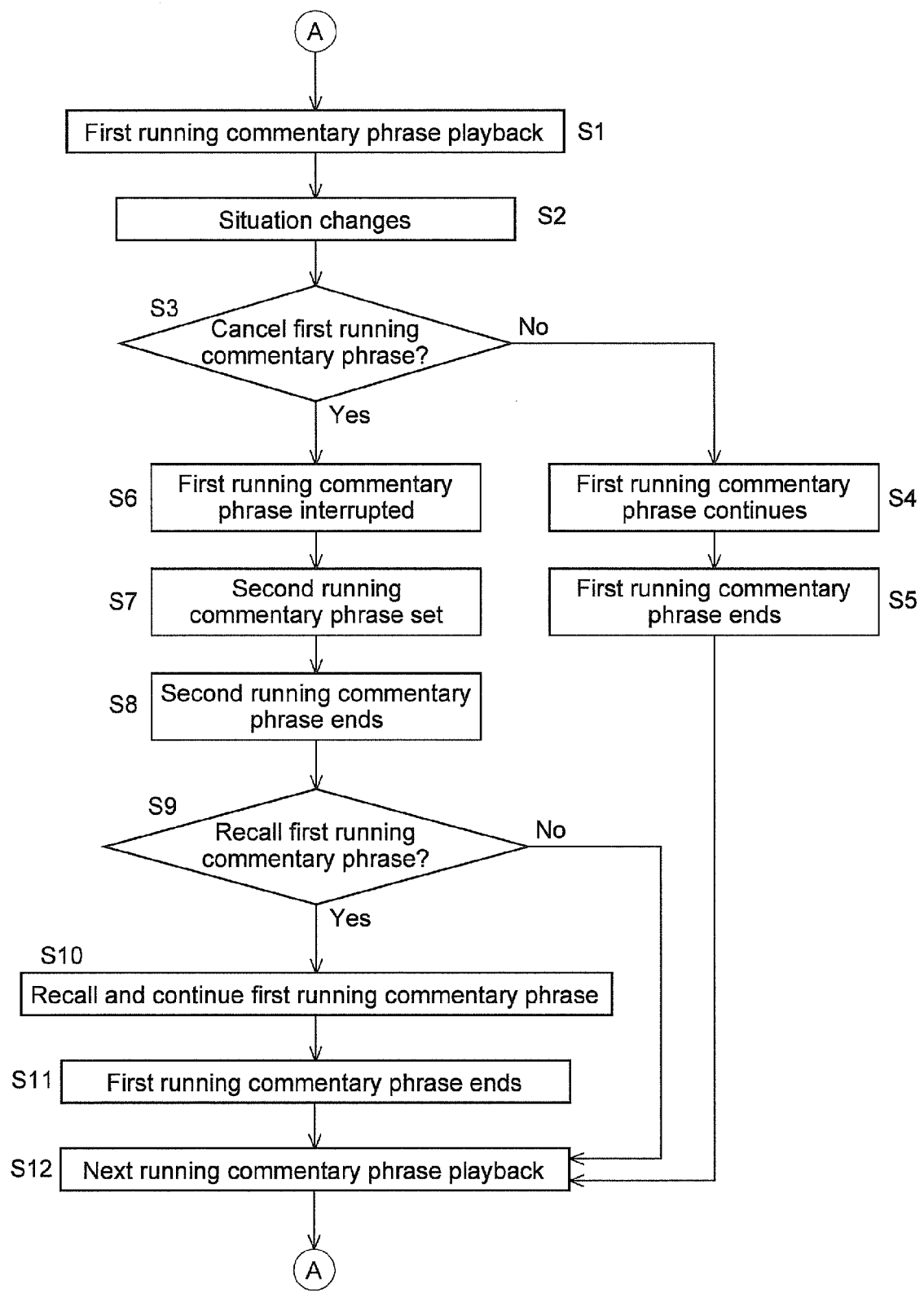
FIG. 3 is a flowchart showing the running commentary function of the baseball video game.

The method for executing the running commentary function of the baseball video game of this embodiment is described using the flowchart shown in FIG. 3.

In a baseball video game which displays player characters on a monitor and wherein the operations of player characters are controlled with the controller 17 and the control unit 1, when a first running commentary is performed in a first running commentary step (S1), and specific events occur during the game (S2), then it is determined in a running commentary interrupting step whether to interrupt the first running commentary according to the details of the specific events (S3). In this step (S3), the first running commentary continues until the end (S4, S5), when the first running commentary is not interrupted (No in S3). In step (S3), the second running commentary is set and executed according to the details of the specific events in the second running commentary step (S6, S7), if the first running commentary is interrupted (Yes in S3). Then, when the second running commentary is complete (S8), it is determined whether to recall the first running commentary in the running commentary returning step (S9). In this step (S9), if the first running commentary is not recalled (No in S9), the next third running commentary, which depends on various events in the game, is executed (S12). In step (S9), when the first running commentary is recalled (Yes in S9), the play-by-play or commentary of the first running commentary which was interrupted by the running commentary interrupting step is recalled with the running commentary returning step, and the play-by-play or commentary of the first running commentary is continued until the end in the running commentary continuing step (S10, S11). Then, the third running commentary, which is next according to various events in the game, is executed (S12).

Process Overview for the Running Commentary Function of the Baseball Video Game

With the running commentary function, running commentary terminology data are controlled by the control unit 1 including the CPU 7, and is stored in the storage unit 2 including the RAM 12, in the terminology storing means 101. These running commentary terminology data are read from the storage unit 2 by the first and second terminology selecting means 110, 120, according to the details of the various events in the baseball video game; and various mutually related phrase data are constructed by the control unit 1. With the control unit 1, various phrase data are collected as phrase group data, for each of the types of content of the various events, and attributes are established for the phrase group data. These running commentary terminology data, phrase data, and phrase group data are controlled by the control unit 1 and stored in the storage unit 2 in the first and second selected terminology storing means 111, 121. In the first and second transmission means 113, 123, the data are transmitted from the first and second selected terminology storing means 111, 121 to the first and second audio output means 112, 122, and output as sound. In this way, the details of the various events in the game are presented as play-by-play or commentary by the first and second running commentary means 102, 104.

The processing executed with the running commentary function of such a baseball video game is described using, as an example, the details of various events in a baseball video game.

In the case of providing batter introductions, for example, the following are used: "bottom", "top", "of the (inning number)", "at bat", "in the field", "batting order", "defensive position", "player's name", "of the (team name)", "uniform number", "lead", "This batter", "is entering", "the (left/right)", "box", and the like. By combining these running commentary terminology data, play-by-play phrase data are constructed, for example: "In the bottom of the fourth, with team A at bat", "the lead batter of the fourth inning is player A", "who is entering the left batter's box", and the like.

In the case of providing commentary on the details of a pitch, for example, terminology such as the following is used: "commentator's name", "honorific", "up to now", "(player's name)'s", "pitching", "how does it look?", "in the (inning number)", "after the", "runs charged to the pitcher", "looking good", "appears to be", "I see", and the like. Using this running commentary terminology, commentator phrase data is constructed, for example: "Mr. Commentator A, what do you think of player B's pitching up to now?" "After those runs in the first inning, he's been looking good", "I see", and the like.

In the case of providing play-by-play of the team at bat, terminology such as the following is used, for example: "first pitch", "Xth ball", "a hit", "hit it", "great", "got it", "is", "was", "but", "foul ball", "home run", "hit", "2 base hit", "2 runs", and the like. By combining this running commentary terminology, play-by-play phrase data are constructed, for example: "the first pitch was hit", "a great hit, but it's a foul ball", "great hit, home run", and the like.

In the case of providing play-by-play of the details of the team in the field, terminology such as the following is used, for example: "a catch", "caught it", "to first base", "back home", "throw", "out", "safe", and the like. Using these running commentary terminology data, play-by-play phrase data are constructed, for example: "that was a catch, nice play, a throw to first, out", "that was a catch, a throw to home, safe", and the like.

In the case of providing play-by-play for the change, for example, the following are provided: "bottom", "top", "of the (inning number)", "offense", "defense", "is finished", "it was a shutout", "it's a come back", and the like. In the case of providing commentary at the end of the game, for example, the following are provided: "As you can see, today", "(team name)", "has won", and the like.

Note that, if a plurality of running commentary terminology data with the same meanings are provided, the rendering of the play-by-play or commentary can be expanded by selecting running commentary terminology data which is preferable for the situation. For example, by preparing running commentary terminology data such as "a hit" and "hit it", the play-by-play or commentary can be provided with variations in the phrase data such as "the first pitch was a hit" and "hit it on the first pitch".

The play-by-play and commentary phrase data shown above is collected into phrase group data according to the contents of the play-by-play or commentary. In the case of player introductions, phrase data items such as "In the bottom of the fourth, team A is at bat", "the lead batter in the fourth inning is player A" and "entering the left batter's box" are collected as phrase group data (first phrase group data). Also, in the case of providing commentary for the details of a pitch, phrase data items such as "Mr. Commentator A, what do you think of player B's pitching up to now?", "After those runs in the first inning, he's looking good", "I see", for example, are collected as phrase group data (second phrase group data). Furthermore, in the case of providing play-by-play for the details of the offense, phrase data items such as "the first pitch was hit" and "great hit, but it's a foul ball" are collected as phrase group data (third phrase group data). The play-by-play and commentary are executed continuously by combining the first through third phrase group data. For example, when the first through third phrase group data are combined in order, a batter introduction such as the following is made: "It's the bottom of the fourth, team A is at bat", "the lead batter in the fourth inning is player A", "who is entering the left batter's box". Next, the details of the pitching by the other team's pitcher are commented upon with "Mr. Commentator A, what do you think of player B's pitching so far?" "After those runs in the first inning, he's looking good", "I see". Finally, the details for the offense are given as a play-by-play with "the first pitch was hit", "It's a great hit, but it's a foul ball".

In this way, play-by-play or commentary is made by using various phrase data collected as phrase group data. At this time, when specific events have occurred while the game is in progress and the play-by-play or commentary has been interrupted (Yes in S3 in FIG. 3), the contents of the play-by-play or commentary at the time of the interruption can be recognized in the storage unit 2 as phrase group data units, by the first selected terminology storing means 111 of the first running commentary means 102 (S6 in FIG. 3). Thereby, when caused to return from the second running commentary means 104 to the first running commentary means 102 by the running commentary returning means 105 (Yes in S9 in FIG. 3), the play-by-play or commentary can be continued from any phrase data in the interrupted phrase group data (S10 in FIG. 3).

Here, it is determined by the running commentary interrupting means 103 whether to interrupt the play-by-play or commentary with the occurrence of specific events while the game is in progress (S3 in FIG. 3). When the details of the specific event are important, the play-by-play or commentary is interrupted by the control unit 1 (Yes in S3 in FIG. 3). However, when the details of the specific event are not important, the play-by-play or commentary is continued with the control unit 1 (No in S3 in FIG. 3). Thus, the branching process for determining whether to interrupt the play-by-play or commentary is executed by the control unit 1 in the running commentary interrupting means when specific events have occurred while the game is in progress.

Attributes are set in each of the various phrase group data. The attributes established for the phrase group data are used to determine whether to recall the play-by-play or commentary of the first running commentary means 102 with the running commentary returning means 105 (S9 in FIG. 3), after the play-by-play or commentary relating to the specific events by the second running commentary means 104 (S7 and S8 in FIG. 3), when specific events have occurred while the game was in progress and the play-by-play or commentary of the first running commentary means 102 was interrupted by the running commentary interrupting means 103 (Yes in S3 in FIG. 3, S6). With this running commentary returning means 105, the attributes established for the phrase group data are referenced with the control unit 1, and it is determined whether to return from the second running commentary means 104 to the first running commentary means 102.

The attributes established for the phrase group data include, for example, normal attribute, recall object attribute, recall execute attribute, and the like. The following is a description of when the running commentary interrupting means 103 and running commentary returning means 105 are executed in the state in which such various attributes are set for the phrase group data.

Figure 4A:
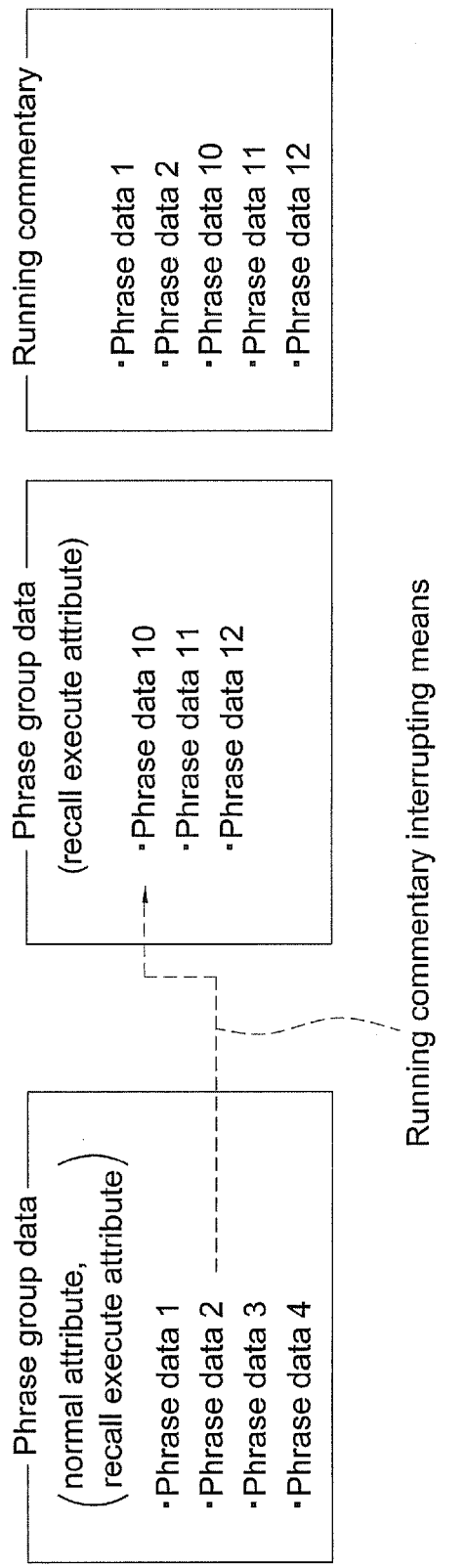
FIG. 4A shows a method for executing running commentary in the running commentary function.
Figure 4B:
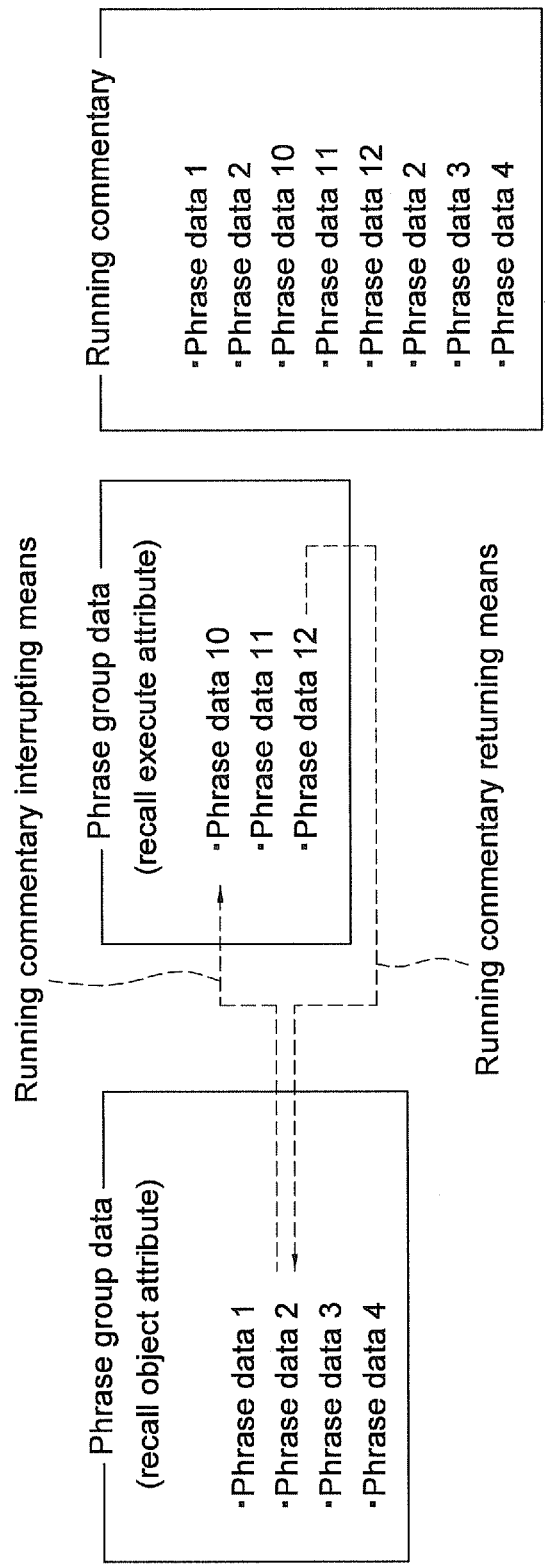
FIG. 4B shows a method for executing running commentary in the running commentary function.

When the normal attribute or recall execute attribute is set for the phrase group data, the phrase group data associated with the phrase data is not recalled when the phrase data is interrupted by the running commentary interrupting means 103 (Yes in S3, No in S9 in FIG. 3). For example, as shown in FIG. 4A, when phrase data in phrase group data having the normal attribute or recall execute attribute is interrupted with phrase group data having the recall execute attribute, play-by-play or commentary using the phrase data of the phrase group data with the recall execute attribute is presented after the interruption. At this time, phrase group data with the normal attribute, associated with the interrupted phrase data, is not recalled. Meanwhile, when the recall object attribute is set for the phrase group data, the phrase group data associated with the phrase data is recalled when the phrase data is interrupted by the running commentary interrupting means 103 (Yes in S3, Yes in S9 in FIG. 3). For example, as shown in FIG. 4B, when the phrase data in the phrase group data having the recall object attribute is interrupted with phrase group data having the recall execute attribute, play-by-play or commentary using the phrase data of the phrase group data with the recall execute attribute is presented after the interruption. At this time, the phrase group data with the recall object attribute associated with the interrupted phrase data is recalled and play-by-play or commentary is presented using the phrase data at the time of the interruption.

Specifically, the following type of play-by-play and commentary is performed if the phrase group data for the batter introduction has the normal attribute, the phrase group data for the pitch details has the recall object attribute, and the phrase group data for the at bat details has the recall execute attribute.

When the phrase data for the batter introduction phrase group data having the normal attribute is interrupted with phrase group data for the at bat details having the recall execute attribute, such play-by-play and commentary is presented as "It's the bottom of the fourth inning and team A is at bat", "the first batter of the fourth inning . . . (interruption)", "the first pitch was hit", "it's a great hit, but it's a foul ball".

When the phrase data for the pitch details phrase group data having the recall object attribute is interrupted with phrase group data for the at bat details having the recall execute attribute, such play-by-play and commentary is made as "It's the bottom of the fourth inning and team A is at bat", "the first batter of the fourth inning is player A", "He's entering the left batter's box", "Mr. Commentator A, what do you think of player B's pitching up to now?", "After those runs in the first inning . . . (interruption)", "the first pitch was hit", "it's a great hit, but it's a foul ball", "Well, sorry, Mr. Commentator A, go ahead (recall)", "After those runs in the first inning, he's looking good", "I see."

Other Embodiments (a) In the foregoing embodiment, an example using a home video game device was shown; however, video game devices can be similarly applied to video game devices for commercial use in which the monitor is integrated, and to personal computers, workstations, or the like, which function as video game devices by executing video game programs, without being limited to the foregoing embodiment.

(b) In the foregoing embodiment, an example using a baseball video game was shown; however, the video game may be any type of game, so long as it is a video game with a running commentary function, without being limited to the foregoing embodiment. For example, the present invention can also be applied to a soccer game or the like, as an example of a video game with a running commentary function.

INDUSTRIAL APPLICABILITY

In the present invention, play-by-play or commentary relating to specific events is performed when specific events have occurred while a video game is in progress and the play-by-play or commentary in progress has been interrupted. The system returns to the interrupted play-by-play or commentary from the play-by-play or commentary related to the specific events, and the interrupted play-by-play or commentary is continued. Thereby, the player can easily grasp various events occurring during the game from the play-by-play or commentary, when such events occur during the game, and experience a sense of realism from the play-by-play or commentary during the game.

What is claimed is:

1. A video game program for causing a computer to implement a video game which displays a character on a monitor, and in which operation of the character is controlled, the video game program comprising:

a terminology storing function for storing running commentary terminology used while the video game is in progress;

a first running commentary function for performing play-by-play or commentary relating to the video game using the running commentary terminology, the play-by-play or commentary including various phrases, the phrases being collected as a first phrase group, the phrase of the first phrase group including the running commentary terminology, the play-by-play or commentary being performed with the phrases collected as the first phrase group;

a running commentary interrupting function for interrupting phrase of the first phrase group running on the process of the first running commentary function when specific events have occurred while the video game is in progress;

a second running commentary function for performing the play-by-play or the commentary relating to the specific events when the process of the running commentary interrupting function has been executed, the play-by-play or commentary including various phrases, the play-by-play or commentary relating to the specific events, the phrases being collected as a second phrase group, the phrase of the second phrase group including the running commentary terminology, the play-by-play or commentary being performed with the phrases collected as the second phrase group;

a running commentary returning function for returning from the phrase of the second phrase group performing on the second running commentary function to the phrase of an interruption point in the first phrase group interrupted on the process of the running commentary interrupting function when the specific events have occurred; and a running commentary continuing function for continuing the play-by-play or commentary, the play-by-play or commentary being performed with the phrase of the first phrase group on the basis of running commentary terminology which is included in the phrase of the interruption point in the first phrase group interrupted by the running commentary interrupting function, when the process of the running commentary returning function has been executed.

2. The video game program recited in claim 1, wherein the first running commentary function includes
   a first terminology selecting function for selecting the running commentary terminology stored in the terminology storing function,
   a first selected terminology storing function for storing the running commentary terminology selected by the first terminology selecting function,
   a first audio output function for converting the running commentary terminology to sound, and outputting the running commentary terminology stored in the first selected terminology storing function, and
   a first transmission function for transmitting the running commentary terminology from the first selected terminology storing function to the first audio output function.

3. The video game program recited in claim 2, wherein the running commentary continuing function continues the play-by-play or the commentary of the first running commentary function, based on the running commentary terminology stored in the first selected terminology storing function of the first running commentary function.

4. The video game program recited in claim 1, wherein the running commentary interrupting function distinguishes the details of the specific events, and determines whether to interrupt the process of the first running commentary function, and interrupts the process of the first running commentary function based on the determination.

5. The video game program recited in claim 1, wherein the second running commentary function includes
   a second terminology selecting function for selecting the running commentary terminology stored in the terminology storing function,
   a second selected terminology storing function for storing the running commentary terminology selected by the second terminology selecting function,
   a second audio output function for converting the running commentary terminology to sound and outputting the running commentary terminology stored in the second selected terminology storing function, and
   a second transmission function for transmitting the running commentary terminology from the second selected terminology storing function to the second audio output function.

6. The video game program recited in claim 1, wherein attributes are set on the phrase group in the first and second running commentary function,
   it is determined whether to execute the process of the running commentary returning function based on the attributes, and
   the process of the running commentary returning function is executed based on the determination.

7. A video game device which displays a character in a video game on a monitor and in which the operation of the character is controlled, comprising:
   terminology storing means for storing running commentary terminology used while the video game is in progress;
   first running commentary means for performing play-by-play or commentary relating to the video game using the running commentary terminology, the play-by-play or commentary including various phrases, the phrases being collected as a first phrase group, the phrase of the first phrase group including the running commentary terminology, the play-by-play or commentary being performed with the phrases collected as the first phrase group;
   running commentary interrupting means for interrupting phrase of the first phrase group running on the process of the first miming commentary means when specific events have occurred while the video game is in progress;
   second running commentary means for performing the play-by-play or the commentary relating to the specific events when the process of the running commentary interrupting means has been executed, the play-by-play or commentary including various phrases, the play-by-play or commentary relating to the specific events, the phrases being collected as a second phrase group, the phrase of the second phrase group including the miming commentary terminology, the play-by-play or commentary being performed with the phrases collected as the second phrase group;
   running commentary returning means for returning from the phrase of the second phrase group performing on the second miming commentary function to the phrase of an interruption point in the first phrase group interrupted on the process of the miming commentary interrupting function when the specific events have occurred; and
   running commentary continuing means for continuing the play-by-play or the commentary, the play-by-play or commentary being performed with the phrase of the first phrase group on the basis of miming commentary terminology which is included in the phrase of the interruption point in the first phrase group interrupted by the running commentary interrupting means, when the process of the running commentary returning means has been executed.

8. A video game method which displays a character in a video game on a monitor and in which the operation of the character is controlled by a processor, comprising machine implemented steps of:
 (a) storing running commentary terminology used while the video game is in progress;
 (b) performing play-by-play or commentary relating to the video game using the running commentary terminology, the play-by-play or commentary including various phrases, the phrases being collected as a first phrase group, the phrase of the first phrase group including the running commentary terminology, the play-by-play or commentary being performed with the phrases collected as the first phrase group;
 (c) interrupting phrase of the first phrase group running on the step (b) when specific events have occurred while the video game is in progress;
 (d) performing the play-by-play or the commentary relating to specific events when the step (c) has been executed, the play-by-play or commentary including various phrases, the phrases being collected as a second phrase group, the phrase of the second phrase group including the running commentary terminology, the play-by-play or commentary being performed with the phrases collected as the second phrase group;
 (e) returning from the phrase of the second phrase group performing on the step (d) to the phrase of an interruption point in the first phrase group interrupted on the step (b) when the specific events have occurred; and continuing the play-by-play or the commentary, the play-by-play or commentary being performed with the phrase of the first phrase group on the basis of running commentary terminology which is included in the phrase of the interruption point in the first phrase group interrupted by the step (c), when the step (e) has been executed.

9. A non-transitory computer readable medium storing a computer program for a video game which displays a character on a monitor, the computer program comprising:
 code for storing running commentary terminology;
 code for performing a first commentary relating to the video game by using the running commentary terminology, when a first event occurs while the video game is in progress, the first commentary including a first commentary group having various phrases, the first commentary being performed with the phrases of the first phrase group;
 code for interrupting phrase of the first phrase group, when a second event occurs while the video game is in progress;
 code for performing a second commentary relating to the second events after interrupting the first commentary, the second commentary including a second commentary group having various phrases, the second commentary being performed with the phrases of the second phrase group;
 code for returning from the phrase of the second phrase group to the phrase of an interruption point in the first phrase group, when the specific events have occurred;
 code for performing the first commentary from an interruption point where the first commentary is interrupted, after the retuning from the phrase of the second phrase group to the interruption point.

\* \* \* \* \*